United States Patent [19]
Nakanishi

[11] Patent Number: 4,861,804
[45] Date of Patent: Aug. 29, 1989

[54] COMPOUND TYPE SILICONE GEL MATERIAL

[75] Inventor: Motoyasu Nakanishi, Fujishi, Japan

[73] Assignee: Kabushiki Kaisha Cubic Engineering, Shizuokaken, Japan

[21] Appl. No.: 87,970

[22] Filed: Aug. 17, 1987

Related U.S. Application Data

[63] Continuation-in-part of Ser. No. 814,726, Dec. 30, 1985.

[30] Foreign Application Priority Data

Dec. 28, 1984 [JP]  Japan ................................ 59-277787

[51] Int. Cl.⁴ .............................. C08J 9/32; C08J 9/22
[52] U.S. Cl. ........................................ 521/54; 521/55; 521/154
[58] Field of Search .................. 523/219; 521/54, 154, 521/55

[56] References Cited

U.S. PATENT DOCUMENTS

| 3,293,663 | 12/1966 | Cronin | 3/36 |
| 3,317,455 | 5/1967 | Blome et al. | 523/219 |
| 3,986,213 | 10/1976 | Lynch . | |
| 4,000,108 | 12/1976 | Yokokawa et al. | 523/219 |
| 4,072,635 | 2/1978 | Jeram | 523/219 |
| 4,433,069 | 2/1984 | Harper | 523/219 |
| 4,502,234 | 3/1985 | Schaefer et al. | 428/283 |

FOREIGN PATENT DOCUMENTS

| 2036720 | 5/1977 | Fed. Rep. of Germany . |
| 3100746 | 7/1982 | Fed. Rep. of Germany . |
| 3210094 | 11/1982 | Fed. Rep. of Germany . |
| 1556612 | 11/1979 | United Kingdom . |

Primary Examiner—Morton Foelak
Attorney, Agent, or Firm—Wenderoth, Lind & Ponack

[57] ABSTRACT

A compound type silicone gel material which uses silicone gel having a penetration of 50 to 200 as basic material and contains a number of fine hollow cells.

5 Claims, 4 Drawing Sheets

COMPOUND TYPE SILICONE GEL MATERIAL

This application is a continuation-in-part, of now abandoned application Ser. No. 814,726, filed Dec. 30, 1985, now abandoned.

BACKGROUND OF THE INVENTION

The present invention relates to a compound type silicon gel material to be used as a shock absorbing material or as a sound and vibration-proof material.

A conventional silicone gel material for use in shock absorption and sound and vibration absorption is made of a gelled silicone resin with the penetration of approximately 50 to 200 measured in accordance with JIS K 2530 - 1976 -(50 g load) as shown in Japanese patent application No. Sho. 59-140,146 filed on July 6, 1984 by the same inventor of this present invention.

Since this kind of silicone gel material has a favorable pressure conductivity similar to a liquid, it disperses and distributes quickly and uniformly an external pressure such as a shock, vibratory wave, etc., which is locally applied, to the ambience and differentiates such external pressure and has a property to absorb this differentiated pressure by virtue of its non-resilient deformation. Accordingly, the silicone gel material provides such effects that a repercussive resilience will not be produced and the external pressure is absorbed in the silicone gel material by its entire action.

Toray Silicone CY52 (brand name), which is manufactured by Toray Silicone Co., Ltd. (Toray Silicone Kaboshi Kaisha), is satisfactory as such kind of silicone gel material and this silicone gel material with a desired penetration can be obtained by mixing liquid A and liquid B of silicone resin as raw material at a specified ratio and heating the mixture.

This conventional silicone gel material has properties such as excellent shock absorbing effect and vibratory wave absorbing effect whereas it cannot provide a high suitability for use in sports goods such as protectors to be used on human bodies since the specific gravity is large, and the conventional gel material cannot easily be used since the cost of this material is expensive.

As object of the present invention is to provide a compound type silicone gel material which contains a number of fine hollow cells and therefore it can provide a similar composition as if air bubbles are contained in silicone gel basic material.

Another object of the present invention is to provide the compound type silicone gel material which is effective in that the thermal resistance and sound and vibration-wave absorption can be increased as compared with conventional silicone gel material.

Another object of the present invention is to provide the compound type silicone gel material of which the specific gravity can be reduced without impairing the shock absorbing effect of silicone gel material.

Another object of the present invention is to provide the compound type silicone gel material of which a total cost can be reduced by adding inexpensive fine hollow cells.

A further object of the present invention is to provide the compound type silicone gel material of which a vibratory wave absorbing property can be set as desired in accordance with the content of fine hollow cells.

SUMMARY OF THE INVENTION

The present invention provides a compound silicone gel material with penetration of approximately 50 to 200 used as a basic material which contains a number of fine hollow cells of generally 5 to 300 μm referred to as "microspheres", "micro balloons", "hollow bubbles" or "synthetic foam" to reduce the specific gravity and cost of silicone gel material.

Said fine hollow cells are available as an organic type and inorganic type. Organic type fine hollow cells have synthetic resin shells and therefore these cells are generally made as resilient fine cells. The compound silicone gel material in accordance with the present invention contains almino-silicate-based fine hollow cells called Fillite (brand name), which is manufactured by Nippon Fillite Co., Ltd. (Nippon Fillite Kabushiki Kaisha), and synthetic resin-based fine hollow cells called Expancel (brand name), which is sold by Nippon Fillite Co., Ltd. (Nippon Fillite Kabushiki Kaisha), for example, in 5 to 50 weight % for the former material and in 1 to 4 weight % for the latter material.

The penetration herein shown is measured in accordance with JIS K 2530 - 1976 - (50 g load).

This standard relates to the petroleum asphalt penetration testing method wherein samples with penetration of 350 or less are tested with a load of 100 g and gelled materials are tested with a load of 50 g.

BRIEF DESCRIPTION OF THE DRAWINGS

The present invention is illustrated in detail by accompanying drawings in which.

DETAILED DESCRIPTION OF THE INVENTION

Figure 1:
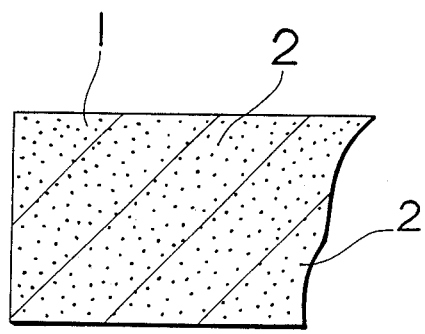
FIG. 1 is a magnified cross-sectional view showing the important part of the compound type silicone gel material in accordance with the present invention.

The silicone gel used in the present invention is identified as Toray Silicone CY52 and is produced by mixing liquid A and liquid B, which liquid components will be discussed below.

Liquid A is composed of components A and C shown below and Liquid B is composed of Components A and B. The silicon material is obtained by blending Liquid A with Liquid B.

Component A: A diorganopolysiloxane expressed by the general formula:

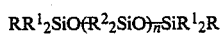

wherein R represents an alkenyl group, $R^1$ represents a monovalent hydrocarbon group having no aliphatically unsaturated bond, $R^2$ represents a monovalent hydrocarbon group (in which at least 50 mole % is methyl and the alkenyl group does not exceed 10 %) and n is a number sufficient to provide a density of Component A of 100–100,000 cSt at 25° C.

Component B an organohydrogenpolysiloxane having a density of not greater than 5000 cSt at 25° C. and having at least three hydrogen atoms bonded to silicon.

Component C: a platinum catalyst.

The silicone gel material is prepared by curing, with the use of a catalytic amount of Component C, a mixture of Components A and B having a molar ratio of the total of the hydrogen atoms bonded to silicon atoms of Component B to the total alkenyl groups bonded to silicon atoms of Component A in the range of 0.1–2.0.

The diorganopolysiloxane of Component A has a straight chain molecular structure. The alkenyl groups at both terminals or the alkenyl groups at both terminals and in the side chains of Component A are reacted (by addition reaction) with the hydrogen atoms bonded to the silicon atoms of Component B thereby to effect crosslinking.

The group R on both terminals is an alkenyl, preferably a lower alkenyl. More preferably, R is a vinyl for reasons of its high reactivity.

The group $R^1$ on both terminals is a monovalent hydrocarbon radical having no aliphatically unsaturated bond. Illustrative of Group $R^1$ are alkyl, phenyl and fluorinated alkyl. Examples of the alkyl are methyl, propyl and hexyl.

The group $R^2$ which constitutes side chains of the diorganopolysiloxane is a monovalent hydrocarbon radical such as alkyl, phenyl, fluorinated alkyl and alkenyl. The alkyl may be, for example, methyl, propyl or hexyl. The alkenyl is preferably a lower alkenyl. The use of vinyl is especially preferred for reasons of its high reactivity. At least 50 mole % of $R^2$ should be methyl. The presence of an alkenyl as a portion of $R^2$ is not critical. Rather, the amount of the alkenyl should to exceed 10 mole %. If the amount of the alkenyl exceeds 10 mole %, the resulting gel becomes excessively hard since the density of crosslinkable sites becomes high.

The viscosity of Component A at 20° C. is 100–100,000 cSt. For reasons of good workability and desirable physical properties after curing, the viscosity is preferably 200–20,000 cSt.

The organohydrogenpolysiloxane of Component B serves as a crosslinking agent for Component A. The hydrogen atoms bonded to the silicon atoms of Component B are addition reacted with the alkenyl groups of Component A to effect curing. Component B has any molecular structure, such as straight chain, branched chain or matrix form. The organic group bonded to silicon atoms of Component B may be exemplified for group $R^1$ of Component A. Preferably, the organic group is methyl alone or a combination of methyl and phenyl. The viscosity of 20° C. of Component B is 5000 cSt or less, preferably 500 cSt or less.

Examples of Component B include a copolymer of an organohydrogensiloxane whose opposite terminals are blocked with triorganosiloxane groups; a copolymerized polysiloxane composed of a tetraorganotetrahydrogencyclotetrasiloxane, an $HR^1{}_2SiO_{\frac{1}{2}}$ unit and an $SiO_{4/2}$ unit; a copolymerized polysiloxane composed of an $HR^1{}_2SiO_{\frac{1}{2}}$ unit, an $R^1{}_3SiO_{\frac{1}{2}}$ unit and an $SiO_{4/2}$ unit; and a copolymerized polysiloxane composed of an $HR^1{}_2SiO_{\frac{1}{2}}$ unit, an $R_2SiO_{\frac{1}{2}}$ unit and an $SiO_{4/2}$ unit ($R^1$ has the same meaning as above).

The Components A and B are used in such amounts that the molar ratio of the total amount of hydrogen atoms on the silicon atoms of Component B to the total amount of alkenyl groups on the silicon atoms of Component A is in the range of 0.1–2.0, preferably 0.1–1.0.

The platinum catalyst of Component C serves to catalyze the addition reaction of alkenyl groups on the silicon atoms of Component A with hydrogen atoms of the silicon atoms of Component B. Illustrative of suitable platinum catalysts are finely divided elemental platinum, chloroplatinic acid, platinum chloride, complex salts of olefin with platinum, platinum alcoholate and complex salts of vinylsiloxane with chloroplatinic acid. Component C is generally used in a catalytic amount, preferably in an amount of at least 0.1 ppm, more preferably at least 0.5 ppm, in terms of elemental platinum, based on the total amount of Components A and B. If Component C is a liquid or may be used in a liquid state, the use of Component C in an amount of at least 200 ppm gives generally good results.

In addition to Components A, B, and C, a pigment, a curing retarder, an antiflaming agent, and a filler (other than non-reinforcing hollow fillers) may be also incorporated in the mixture.

The mixture containing Components A, B and C undergoes curing and becomes a gel when allowed to stand at room temperature or when heated. Quick curing may be attained by heating the mixture at 50°–160° C.

The following represents specific examples of preparing the silicone gel from liquids A and B.

EXAMPLE 1

100 parts by weight of a diorganopolysiloxane having a viscosity at 25° C. of 100cSt and expressed by the formula:

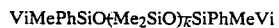

wherein Vi stands for a vinyl group, Me stands for a methyl group, Ph stands for a phenyl group and k is a number of about 200; 0.19 part by weight of methylhydrogenpolysiloxane having a viscosity at 25° C. of 30 cSt and expressed by the formula:

wherein Me stands for a methyl group and p is a number of about 40; and a 10% solution of chloroplatinic acid in isopropyl alcohol and an amount of 5 ppm in terms of elemental platinum based on the total amount of the diorganopolysiloxane and methylhydrogenpolysiloxane were mixed with each other. The mixture, after defoaming treatment, was placed in a hot air oven at 80° C. for 30 min to give a colorless, transparent gel. The molar ratio of the total amount of the hydrogen atoms on the silicon atoms of the methylhydrogenpolysiloxane to the total amount of the vinyl groups on the silicon atoms of the diorganopolysiloxane was 0.22/1.

EXAMPLE 2

100 parts by weight of a diorganopolysiloxane having a viscosity of 25° C. of 1100 cSt and expressed by the formula:

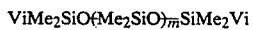

wherein Vi and Me have the same meanings as the above group, Ph stands for a phenyl group and m is a number of about 200; 0.55 part by weight of a methylhydrogenpolysiloxane having a viscosity at 25° C. of 10 cSt and expressed by the formula:

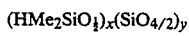

wherein Me stands for a methyl group and x and y are numbers providing x/y of 2.0; and a 10% solution of chloroplatinic acid in n-butanol in an amount of 8 ppm in terms of elemental platinum based on the total amount of the diorganopolysiloxane and methylhydrogenpolysiloxane were mixed with each other. The mixture, after defoaming treatment, was placed in a hot air oven at 100° C. for 20 min to give a colorless, transparent gel. The molar ratio of the total amount of the hydrogen atoms on the silicon atoms of the methylhydrogenpolysiloxane to the total amount of the vinyl groups on the silicon atoms of the diorganopolysiloxane was 0.44/1.

The following represents specific embodiments of the present invention comprising a silicone gel have a penetration value of 50–200 as measured by JIS K 2530-1976, 50 g load, such gel having dispersed therein fine hollow microspheres formed of a synthetic resin or inorganic material, each of said microspheres having an elastic shell, wherein the content of said hollow microspheres in the silicone gel is about 1–4% by weight.

Embodiment 1

In case of Expancel DE (brand name) with specific gravity of 0.04 and the price of ¥7,000/kg is mixed in silicone gel basic material with specific gravity of 0.98, the results as shown in Table 1 were obtained.

The price percentages are obtained from comparison in the same capacity between the price of silicon gel material itself and the price of material containing silicone gel and Expancel in reference to the price of silicon gel material itself as 1.

TABLE 1

| Mixing ratio for Expancel (Weight %) | Specific gravity | Price |
|---|---|---|
| 0.5 | 0.98 | 0.91 |
| 1.0 | 0.81 | 0.82 |
| 1.4 | 0.75 | 0.76 |
| 1.5 | 0.74 | 0.75 |
| 2.0 | 0.68 | 0.69 |
| 3.0 | 0.58 | 0.62 |
| 4.0 | 0.51 | 0.53 |

Embodiment 2

In case Fillite (brand name) with specific gravity of 0.5 and the price of ¥850/kg is mixed in silicone gel basic material with specific gravity of 0.98, the results as shown in Table 2 were obtained.

The price percentages are shown in the same comparative values as shown in Table 1.

TABLE 2

| Mixing ratio for Fillite (Weight %) | Specific gravity | Price |
|---|---|---|
| 5 | 0.95 | 0.92 |
| 10 | 0.91 | 0.84 |
| 15 | 0.87 | 0.77 |
| 20 | 0.83 | 0.71 |
| 25 | 0.80 | 0.65 |
| 30 | 0.76 | 0.59 |

| Mixing ratio for Fillite (Weight %) | Specific gravity | Price |
|---|---|---|
| 35 | 0.73 | 0.56 |
| 40 | 0.70 | 0.50 |
| 45 | 0.68 | 0.47 |
| 50 | 0.66 | 0.44 |

It was clarified in this comparison test that, if Fillite of more than 25% is added, the hardness of compound type silicone gel material would be excessively high and the material would be unsuitable as shock absorber for practical use.

However, if the quantity of Fillite is increased, a frictional resistance which takes place between Fillite and silicone gel which is a basic material becomes large when the compound type silicone gel material receives a vibration, and therefore the vibratory wave absorbing effect will be improved until the quantity of Fillite increases up to approximately 50 weight %.

If the quantity of Fillite exceeds 60 weight %, it will be difficult to form the compound silicone gel material, it is therefore unsuitable for practical use.

The compound type silicone gel material used in said embodiment of the present invention is made up by mixing liquid A and liquid B of silicone resin which is a basic material, adding fine hollow cells to the mixture and heating this silicone resin liquid mixed with liquids A and B.

It was known from said embodiments that it was preferable to mix resilient hollow cells such as Expancel of approximately 1.5 to 4.0% in the compound type silicone gel material according to the present invention which was used as a shock absorbing material and Fillite of approximately 15 to 20% for use in the applications where the thermal resistance was considered an important factor.

In other words, resilient hollow cells are capable of increasing a shock absorbing effect and improving the recoverability of the compound type silicone gel material of the present invention since the cells can add a resisting force owing to elastic deformation to the shock absorbing effect owing to non-elastic deformation of silicone gel material.

If the compound type silicone gel material according to the present invention is used as a vibratory wave absorbing material such as, for example, a sound or vibration-proof material, it is recommended to mix approximately 25 to 50% of Fillite in it. If so, a favorable vibratory wave absorbing effect at a low frequency band can be obtained as shown in FIGS. 3 to 8.

The compound type silicone gel material according to the present invention contains a number of fine hollow cells 2 in silicone gel basic material 1 as shown in FIG. 1 and accordingly the same composition as if a number of bubbles are formed in the basic material by fine hollow cells 2 can be obtained.

Figure 2:
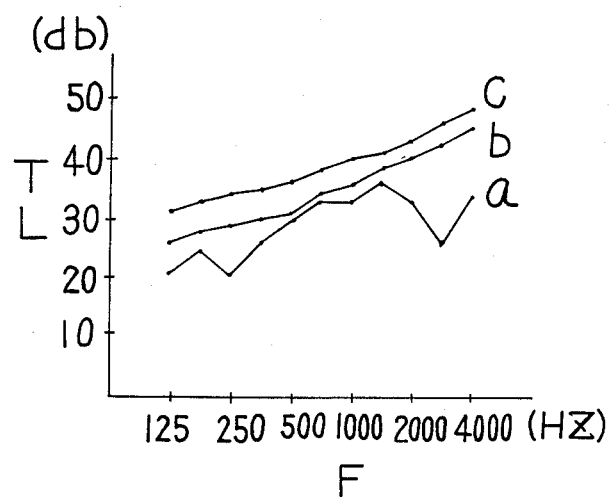
FIG. 2 is a graph showing the sound transmission loss rate of said silicone gel material at the high frequency band.

This compound type silicone gel material according to the present invention can provide a more favorable vibratory wave absorbing effect than conventional silicone gel material as shown in FIG. 2 even at a high frequency band.

FIG. 2 is the table showing how the sound pressure with the sound frequency F of 125~4000 Hz is attenuated by shock absorber plates a, b and c. The sound transmission loss is obtained from the expression as given below.

$$TL = D + 10 \log (S/A)$$

where, $$D = L_1 - L_2$$

TL = Sound transmission loss (db)
D = Space sound pressure level difference (db)

S = Area of test sample (m²)
A = Sound absorbing capacity of the reverberatory chamber for receiving sound (m²)
$L_1$ = Average sound pressure level of the reverberatory chamber for the sound surface (db)
$L_2$ = Average sound pressure level of the reverberatory chamber for receiving sound.

In FIG. 2, line a shows the vibratory wave absorbing property of glass plate of 6 mm in thickness, line b shows the vibratory wave absorbing property of a vibration-proof plate which is made up by providing only a silicone gel material layer of 1 mm in thickness with the penetration of 150 between two glass plates of 3 mm in thickness and line c shows the vibratory wave absorbing property of a vibration-proof plate which is made up by providing the compound type silicone gel material according to the present invention which is made from silicone gel basic material with penetration of 150 containing 3 weight % of Expancel between two glass plates of 3mm in thickness.

Furthermore it was clarified that the compound type silicone gel material in accordance with the present invention would provide a remarkable shock absorbing effect as compared with Ensolite (brand name), which was manufactured by Uniroyal Corporation in the United States and was well known as a foamed polyethylene-based shock absorbing material, and the conventional silicone gel material as shown with the results of the steel ball dropping shock test in Table 3 below. In this steel ball dropping shock test, a steel ball of 510 g in weight was dropped from the height of 69 cm onto a shock absorbing material placed on the steel table and a shock conducted to the table at this time was detected and measured by the pickup provided at the underside of the table.

In this shock test, the bombarding speed of a steel ball was 3.68 m/s and the momentum was 1.88 kg-m/s. The storage oscilloscope which was manufactured by Kikusui Denshi Kogyo K.K was used to measure the maximum impact force and T ½.

TABLE 3

| | First test: | | |
|---|---|---|---|
| Sample No. | Shock absorbing material (thickness: 10 mm) | Max. impact force (kgw) | T ½ (ms) |
| 1 | Ensolite | 58.4 | 0.80 |
| 2 | Silicone gel material only | 34.8 | 0.70 |
| 3 | Compound type silicon gel material No. 1 | 28.0 | 0.80 |
| 4 | Same as above No. 2 | 18.9 | 1.25 |
| 5 | Same as above No. 3 | 27.6 | 1.10 |
| | Second test: | | |
| Sample No. | Shock absorbing material (thickness: 10 mm) | Max. impact force (kgw) | T ½ (ms) |
| 1 | Ensolite | 57.3 | 0.90 |
| 2 | Silicone gel material only | 34.3 | 0.75 |
| 3 | Compound type silicone gel material No. 1 | 30.9 | 0.80 |
| 4 | Same as above No. 2 | 18.1 | 1.25 |
| 5 | Same as above No. 3 | 29.0 | 1.05 |

In Table 3, the conventional silicone the sample No.2 has the penetration of 150, and the compound type silicone gel material No. 1 with the sample No. 3 according to the present invention is made up by mixing silicone gel basic material having the penetration of 150 with Expancel DE of 1.4 weight %. The compound type silicone gel material No. 2 with the sample No. 4 according to the present invention is made up by mixing silicone gel basic material having the penetration of 150 with Expancel DE of 3.0 weight % and the compound type silicone gel material No. 3 with the sample No. 5 according to the present invention is made up by mixing silicone gel basic material having the penetration of 150 with Fillite 300/7 of 20 weight %.

Figure 3:
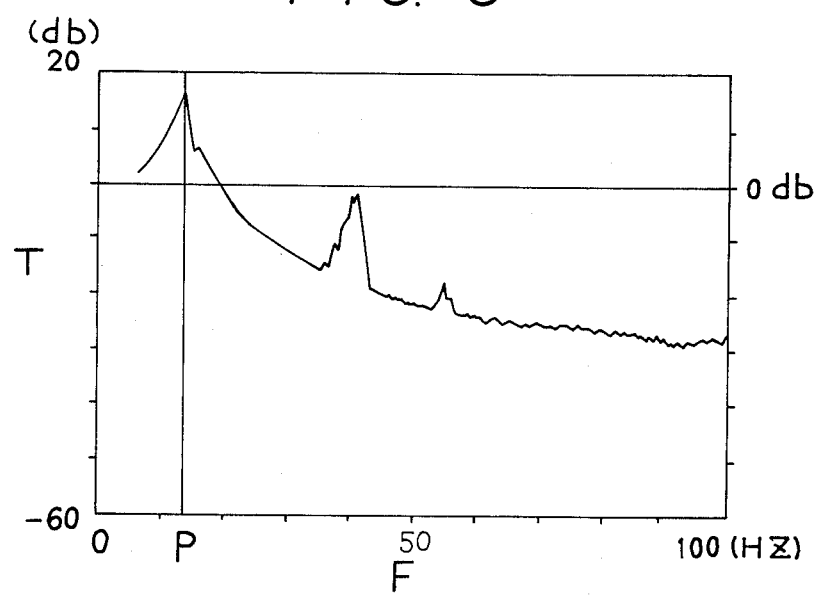
FIGS. 3 to 8 are respectively the transmission rate of said compound type silicone gel material at the low frequency band.

The following describes the results of tests in which the vibratory wave absorbing characteristics of the compound type silicone gel material according to the present invention at the low frequency band (5~100 Hz) were measured, referring to FIG. 3 and other figures.

In the tests, an insulator was used which was made up by filling a cylinder made of silicone rubber having the diameter of 30 mm and height of 20 mm with the compound type silicone gel material for which the quantity of Fillite to be mixed was predetermined. And in the test, the transmission rate T in reference to frequency F was measured.

In the test as shown in each figure, three insulators were used. These three insulators were set on the table of the exciting machine which would provide an acceleration of 0.15 G and a load of 6 kg was supported by these three insulators, and vibration G' conducted to the load in reference to vibration G of the table of the exciting machine was measured in terms of G'/G.

The 0 db line shows the "1" level of transmission rate T (db), which is obtained from the expression of $T = 20 \log(G'/B)$.

As known from FIGS. 3 to 8, the higher the mixing ratio of Fillite in the compound type silicone gel material according to the present invention is, the nearer the position of the sympathetic vibration point P is shifted to the high frequency side.

This results from that the hardness of the compound type silicone gel material increases along with an increase of the quantity of Fillite mixed and consequently the spring constant becomes large. Since the vibratory wave absorbing effect cannot be obtained until the curve of the transmission rate goes down to the 0 db line, the mixing ratio of the compound type silicone gel material is generally set so that the high frequency vibration may be absorbed by shifting the sympathetic vibration point P to the low frequency side; for example, the frequency of rotational vibration of the motor is 50 to 60 Hz and the sympathetic vibration point P in this case is set at approximately 20 to 30 Hz.

In the test, the sympathetic vibration point P is shifted to the high frequency side in accordance with the increase of the quantity of Fillite to be added since the load is invariable. This sympathetic vibration point P can be shifted to the low frequency side by increasing the load and therefore the quantity of Fillite to be mixed can be determined in reference to the load.

As known from that the position of the sympathetic vibration point P is determined with the spring constant of this compound type silicone gel material, it can be shifted as required by varying the diameter and height of the insulator.

The following describes the transmission rate of the sympathetic vibration point P or the oscillation magnification of the compound type silicone gel material.

As well known, in case of the vibratory wave absorbing material, it is desirable that the transmission rate T of the sympathetic vibration point P should be small and the sympathetic vibration point P should be within the frequency band of 15 to 20 Hz. In case of the compound type silicone gel material according to the present invention, the transmission rate T can be reduced by adjusting the quantity of Fillite to be mixed.

The transmission rate T can be reduced by increasing the quantity of Fillite to be mixed when the load is fixed.

The compound type silicone gel material used in the test as shown in FIG. 3 contains Fillite of 5 weight % and is shown as the test sample No. 1 in Table 4 below.

Figure 4:
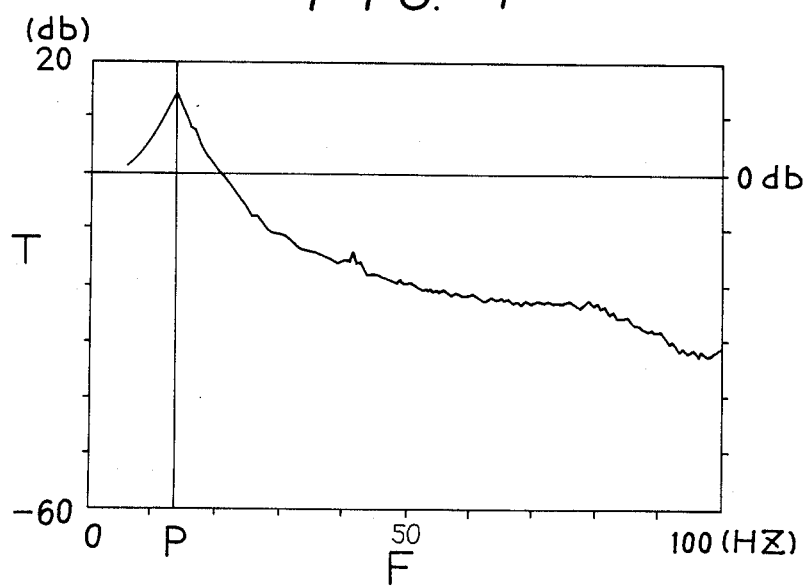

In the test as shown in FIG. 4, the compound type silicone gel material containing 10 weight % of Fillite is used and shown as the test sample No. 2 in Table 4.

Figure 5:
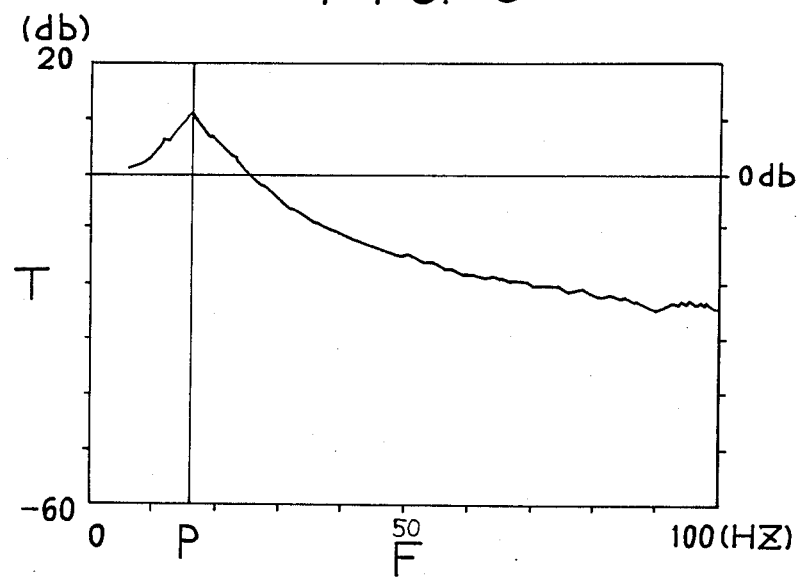

In the test as shown in FIG. 5, the compound type silicone gel material containing 20 weight % of Fillite is used and shown as the test sample No. 3 in Table 4.

Figure 6:
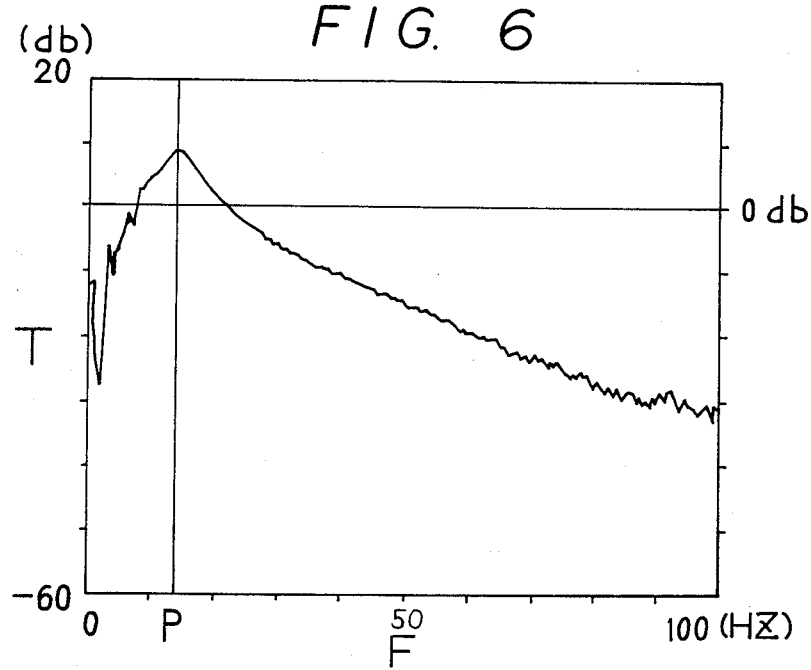

In the test as shown in FIG. 6, the compound type silicone gel material containing 25 weight % of Fillite is used and shown as the test sample No. 4 in Table 4.

Figure 7:
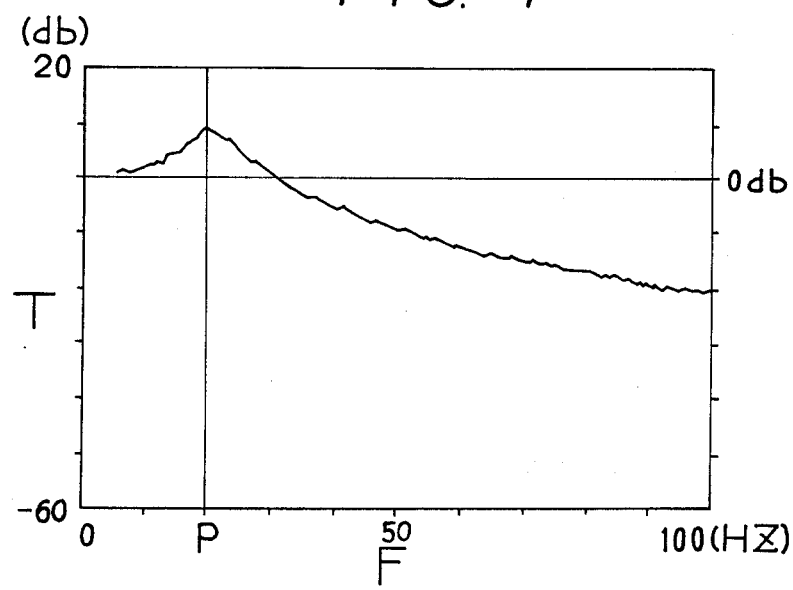

In the test as shown in FIG. 7, the compound type silicone gel material containing 30 weight % of Fillite is used and shown as the test sample No. 5 in Table 4.

Figure 8:
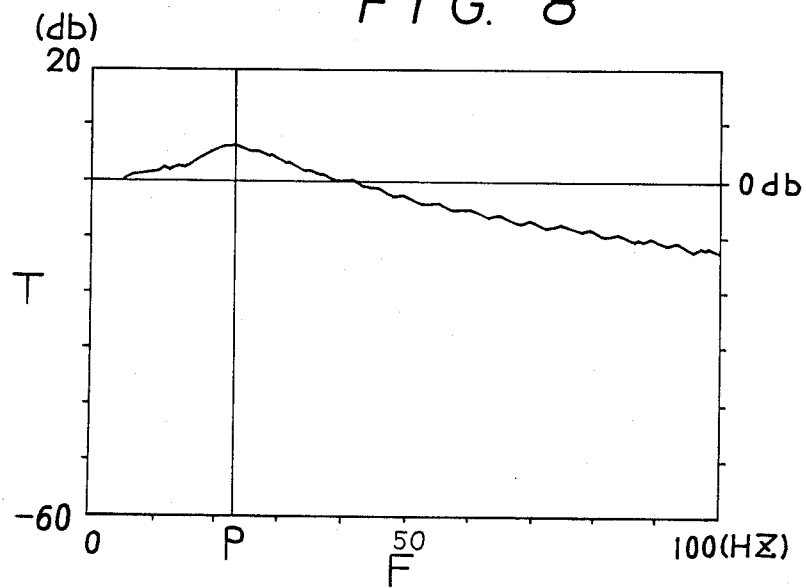

In the test as shown in FIG. 8, the compound type silicone gel material containing 40 weight % of Fillite is used and shown as the test sample No. 6 in Table 4.

TABLE 4

| Test sample No. | Frequency of sympathetic vibration point | Transmission rate of sympathetic vibration point |
|---|---|---|
| 1 | 13.5 | 7.11 |
| 2 | 13.5 | 5.09 |
| 3 | 16.0 | 3.63 |
| 4 | 14.0 | 2.92 |
| 5 | 19.5 | 2.92 |
| 6 | 22.5 | 2.03 |

The present invention can be embodied in a variety of ways other than as specifically described.

The silicone gel material of the present invention has superior impact resistance in comparison with conventional silicone gel compositions, such as that described in U.S. Pat. No. 4,072,635 which discloses the incorporation of fine hollow spherical fillers in a silicone gel. This is attributed to the fact that the diorganopolysiloxane of the formula:

$$RR^1{}_2SiO(R^2{}_2SiO)_n SiR^1{}_2R$$

having alkenyl groups on both terminal ends or both ends and side chains is used in place of copolymers of $R_2ViSi_{1/2}$, $RViSiO_{3/2}$ and $MeR_2SiO_{1/2}$, so that the resulting silicone gel is not pulverized or destroyed when subjected to a weak impact.

What is claimed is:

1. A silicone gel composition useful as a shock absorbing material or as a sound and vibration-proof material consisting essentially of a blend of a silicone gel having a penetration of 50–200 as measured by JIS K 2530-1976, 50 g load, and fine hollow microspheres formed of a synthetic resin and each having an elastic shell, the content of said hollow microspheres in the silicone gel material being 1–4% by weight.

2. A silicone gel composition useful as a shock absorbing material or as a sound and vibration-proof material consisting essentially of a blend of a silicone gel having a penetration of 50–200 as measured by JIS K 2530-1976, 50 g load, and fine hollow inorganic microspheres, the content of said hollow microspheres in the silicone gel material being greater than 25% by weight but not greater than 50% by weight.

3. A silicone gel composition according to claim 2, wherein said fine hollow microspheres are formed of an aluminosilicate.

4. a shock absorbing material made of the silicone gel composition of claim 1.

5. A sound and vibration proof material made of the silicone gel composition of claim 3.

* * * * *